United States Patent [19]

Dukess

[11] 4,322,673
[45] Mar. 30, 1982

[54] HIGHWAY PRESSURE-RESPONSIVE MEANS FOR GENERATING ELECTRICITY BY VEHICLES

[76] Inventor: Joseph Dukess, 931 Greacen Point, Mamaroneck, N.Y. 10543

[21] Appl. No.: 54,277

[22] Filed: Jul. 2, 1979

[51] Int. Cl.³ .......................... H02P 9/00; F03G 5/00
[52] U.S. Cl. ......................................... 322/35; 60/668; 290/55; 417/229
[58] Field of Search ................. 322/4, 35, 40; 320/61; 417/229; 60/668; 290/44, 55, 54; 310/69, 75 R

[56] References Cited

U.S. PATENT DOCUMENTS

| | | | |
|---|---|---|---|
| 1,771,200 | 7/1930 | Akers | 417/229 |
| 2,060,890 | 11/1936 | Olafson | 417/229 X |
| 3,507,580 | 4/1970 | Howard et al. | 320/61 UX |
| 3,861,487 | 1/1975 | Gill | 320/61 X |
| 4,004,422 | 1/1977 | Levan | 60/668 X |
| 4,081,224 | 3/1978 | Krupp | 417/229 |

FOREIGN PATENT DOCUMENTS 1332202 10/1973 United Kingdom .................. 322/40

*Primary Examiner*—Robert J. Hickey
*Attorney, Agent, or Firm*—Kenneth S. Goldfarb

[57] ABSTRACT

An energy conservation and highway safety apparatus for supplying supplemental or emergency electrical power caused by passage of vehicles over the apparatus comprising a plurality of elongated conduits having a plurality of pressure responsive pumping elements mounted therein. The conduits are connected through an accummulator to an air motor which drives a generator.

2 Claims, 5 Drawing Figures

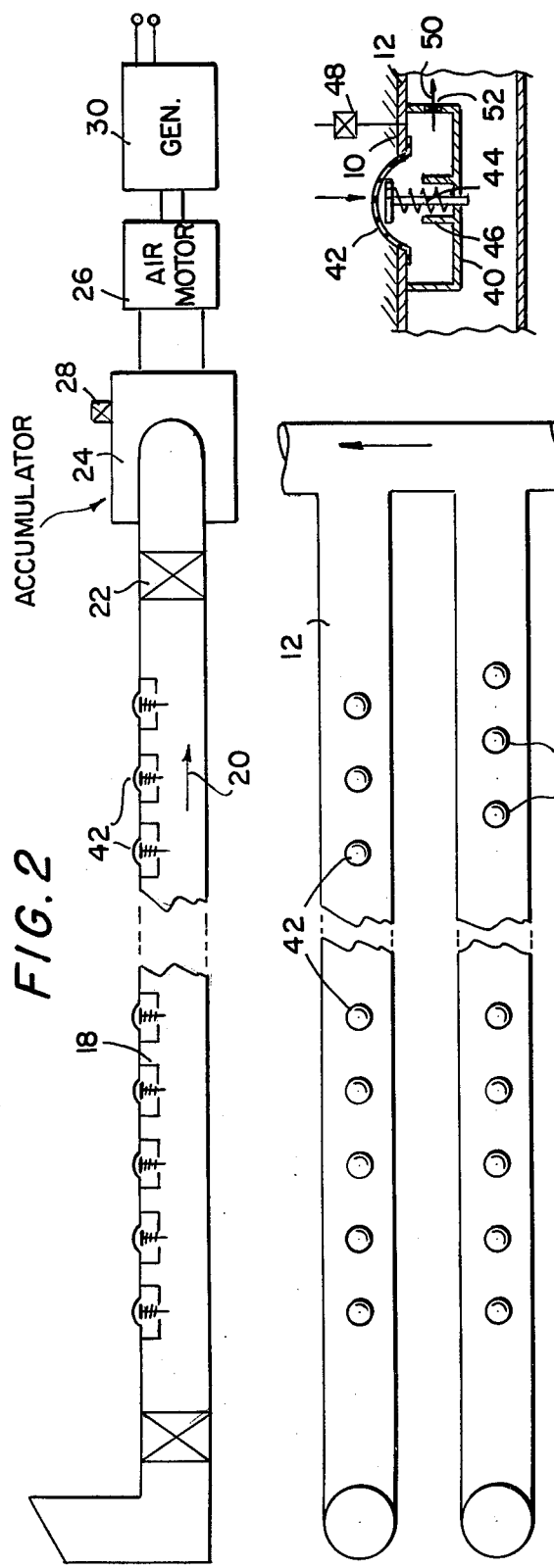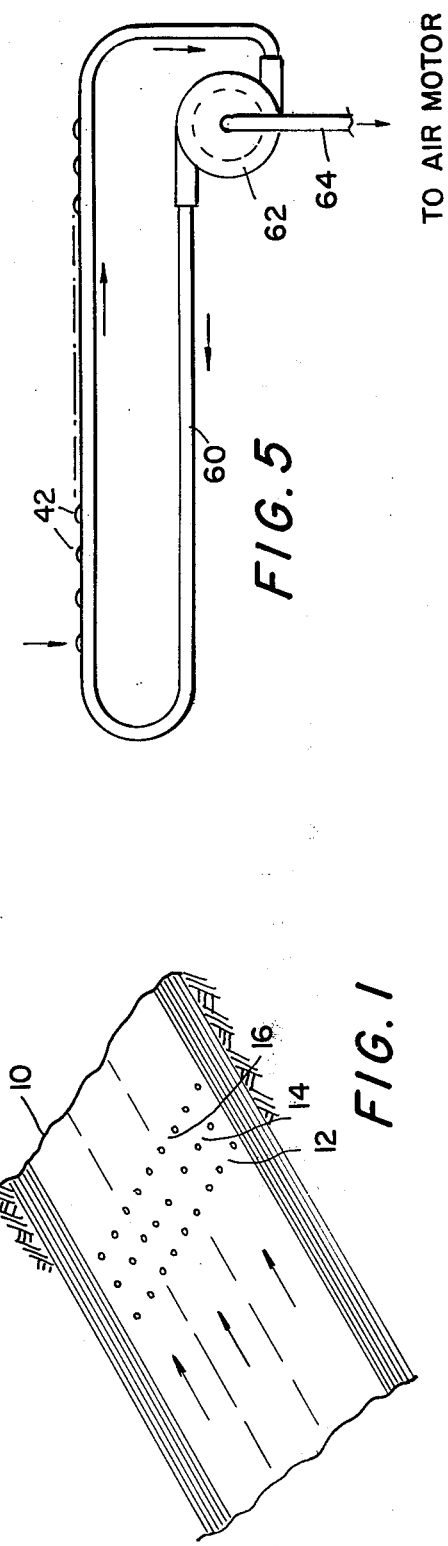

HIGHWAY PRESSURE-RESPONSIVE MEANS FOR GENERATING ELECTRICITY BY VEHICLES

BACKGROUND OF THE INVENTION

1. FIELD OF THE INVENTION

This invention relates to conservation of energy and more particularly to the auxiliary generation of energy by means of passage of vehicles over an apparatus embedded in a highway.

2. DESCRIPTION OF THE PRIOR ART

In the past numerous pressure sensitive means have been placed on a highway or roadbed for counting the number of vehicles passing, measuring speed of vehicles, and providing for the signalling the approach of a vehicle. These devices required the use of power to actuate the signals produced thereby.

Various types of devices have been used in the past such as corrugations or ridges in the highway or domes which may have been illuminated for warning the motorist of approaches to toll booths, stop light, intersections and other danger or caution points.

Also in the past various devices for the generation of electricity have been devised which use operation of a vehicle such as an automobile or the like to provide for generation of power. Such a device is disclosed in U.S. Pat. No. 3,859,589 for Electric Generation Apparatus in the name of Charles G. Rush.

SUMMARY OF THE INVENTION

The present invention provides for the generation of electricity through the passage of a vehicle along a roadway which actuates a fluid powered motor to drive a generator. The passage of the vehicle actuating pressure responsive means to pump the fluid to the motor thereby driving the generator to supply auxiliary power to the highway grid or for use in signalling on the highway or for general electrical power elsewhere.

Electrical breakdowns occur during high peak use of the electrical grid which generally occurs during the urban rush hours. The present invention contemplates the use of the vehicle's mode of power to generate electricity to insure highway safety while also providing a warning to the vehicle's operator that the vehicle is approaching an area of danger, such as a toll booth, intersection, or the like. The energy conservation apparatus according to the present invention includes at least one illuminated conduit and preferably a series thereof which have mounted therein a plurality of pressure responsive fluid pumping means which deliver air or other fluid to a fluid motor thereby driving a generator.

Still further features of the invention will become apparent as the following description proceeds, preferred embodiments of the present invention being shown in the accompanying drawing, by way of example only, wherein:

BRIEF DESCRIPTION OF THE DRAWING

FIG. 1 is a schematic illustration of a roadway in which the present invention is employed;

FIG. 2 is a schematic elevational view showing the arrangement of parts incorporated in the present invention;

FIG. 3 is a schematic plan view illustrating the manner in which the conduits according to the present invention can be arranged;

FIG. 4 is an enlarged sectional detail view illustrating in detail the construction of one of the pressure responsive pumping elements according to the present invention; and, FIG. 5 is a schematic view of a self-contained fluid actuated apparatus.

DETAILED DESCRIPTION OF THE INVENTION

With continuing reference to the accompanying drawing, wherein like reference numerals designate similar parts throughout the various views, reference numeral 10 indicates a roadway in which a plurality of conduits 12, 14, 16, etc. are embedded. These conduits are preferably in the form of hollow tubes, preferably of an air-tight resilient material such as plastic or the like, but which may be formed of metal, and which have mounted in them a plurality of pressure responsive pumping elements 18 which extend above the roadway. These pressure responsive pumping elements 18 are designed to be engaged by the wheels of a vehicle and depressed to pump air through the conduit in the direction of arrow 20 and thence through a one-way valve 22 to an accummulator 24 which is connected to an air motor 26. The accummulator may be provided with a pressure relief valve 28. The motor 26 drives a generator 30, the output of which is adapted to be connected to the highway grid, emergency illuminating or signal lights or to the general electric supply grid. Various types of pressure responsive pumping elements may be used. As shown, the pumping unit 18 includes a housing 40 attached to the conduit 12 below the roadbed 10 and a dome-like resilient pumping member 42 which extends above the roadbed 10. A spring assembly 44 is mounted in guides 46 and designed to restore the dome 42 to a raised position after it has been depressed. Air is received through a one-way intake valve 48 and expelled in the direction of arrow 50 into the conduit 12 through a one-way exhaust valve 52. In this manner sufficient air pressure is built up in the accummulator 24 through passages of the plurality of vehicles approaching an intersection, toll booth, or the like to drive the motor 26 and hence the generator 30.

In lieu of the conduit 12, a conduit 60 of a sealed variety may be connected to a fluid motor 62 and thence through a drive shaft 64 to a generator for driving the generator. Hence, the apparatus can be utilized with either liquids or air or other gases as may be desired for operation.

In use, the continuous passage of vehicles over the pressure responsive pumping elements which may be aligned or staggered in rows not only serve to provide a warning to the vehicles by physical contact thereof with the wheels of the vehicle of the approach of a danger point, but actually serve to generate electricity. Thus, the same frictional loss of energy to the vehicles heretofore lost by the vehicles engaging convolutions in the roadway or the like is reclaimed by the present apparatus which serves the dual function of generating electricity both as an emergency highway safeguard and for the general electrical grid, especially at rush hours, and for providing the motorist with a warning of an approaching toll booth or the like.

The apparatus may be used on downhill section of a roadway to aid in slowing vehicles, warning of danger, which functioning to convert energy.

What is claimed is:

1. An energy conservation and highway safety apparatus for supplying supplementary electrical power caused by passage of vehicles over the apparatus comprising a plurality of elongated conduits embedded across a roadway, a plurality of pressure responsive means mounted in said each of conduits and extending above the surface of the roadway for pumping air through said conduits when a vehicle passes thereover while providing a warning to the vehicle, each of said pressure responsive means including a one way exhaust valve for delivering air of under pressure into one of said conduits, each of said pressure responsive means including a one way intake valve to suck air back therein from the atmosphere, accumulator means connected to said conduits, motor means connected to said accumulator means and actuated by air pressure from said accumulator means, a generator, said motor means driving said generator for producing electrical energy, each of said pressure responsive means being deformable and including a dome rising above the surface of the roadway, and a spring in each of said pressure responsive means for restoring the shape thereof after depression and for drawing air back into said pressure responsive means.

2. An apparatus according to claim 1, wherein said generator supplies energy for highway emergency lighting.

* * * * *